J. E. LEONARD.
SPOT FINDER.
APPLICATION FILED MAY 19, 1919.
1,356,868.
Patented Oct. 26, 1920.
3 SHEETS—SHEET 1.
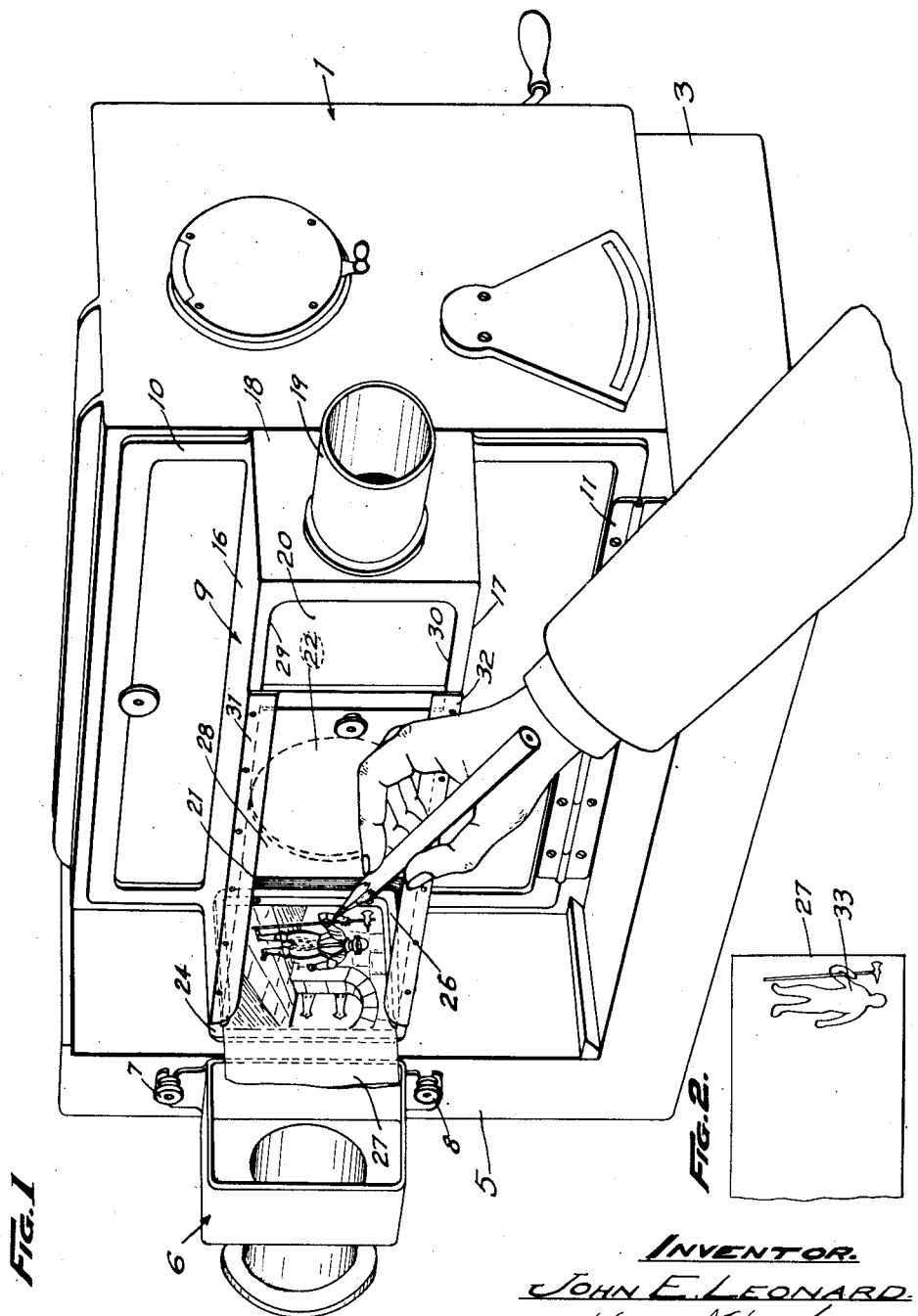

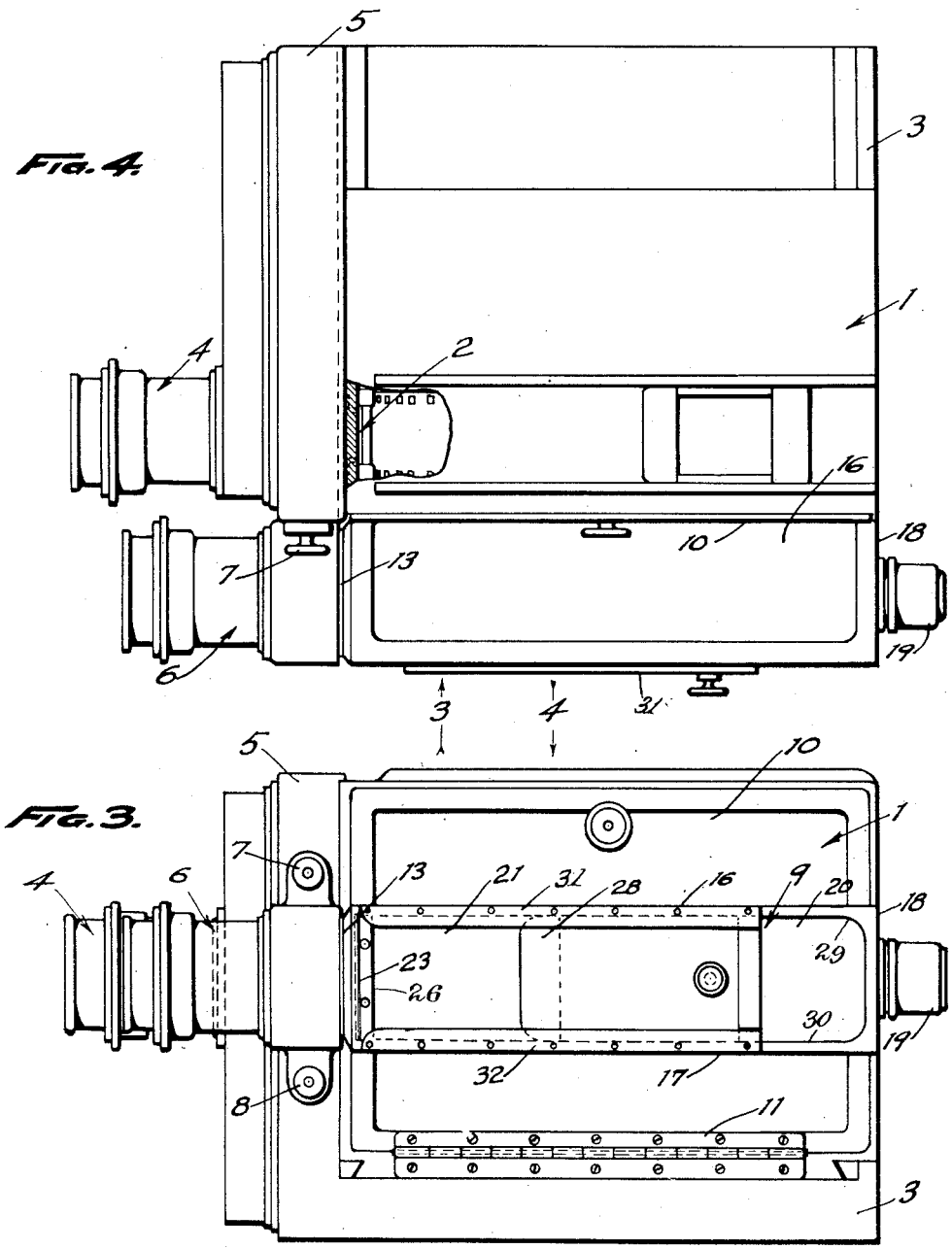

J. E. LEONARD.
SPOT FINDER.
APPLICATION FILED MAY 19, 1919.

1,356,868.

Patented Oct. 26, 1920.
3 SHEETS—SHEET 3.

INVENTOR.
JOHN E. LEONARD
BY Hazard & Miller
ATTORNEYS.

UNITED STATES PATENT OFFICE.

JOHN E. LEONARD, OF LOS ANGELES, CALIFORNIA, ASSIGNOR TO THE NATIONAL MOTION PICTURE CAMERA COMPANY, OF LOS ANGELES, CALIFORNIA, A CORPORATION OF CALIFORNIA.

SPOT-FINDER.

1,356,868.   Specification of Letters Patent.   Patented Oct. 26, 1920.

Application filed May 19, 1919. Serial No. 298,294.

*To all whom it may concern:*

Be it known that I, JOHN E. LEONARD, a citizen of the United States, residing at Los Angeles, in the county of Los Angeles and State of California, have invented new and useful Improvements in Spot-Finders, of which the following is a specification.

My object is to make a spot finder for motion picture cameras and the like and my invention consists of the novel features herein shown, described and claimed.

Figure 1 is a perspective of a motion picture camera provided with a spot finder in accordance with the principles of my invention and showing the operation.

Fig. 2 is a view in elevation of the marked templet produced by the operation shown in Fig. 1.

Fig. 3 is a side elevation of the camera shown in Fig. 1, the view being taken looking in the direction indicated by the arrow 3 in Fig. 4.

Fig. 4 is a top plan view as indicated by the arrow 4 in Fig. 3 and showing the camera box in photographing position.

Figure 5:
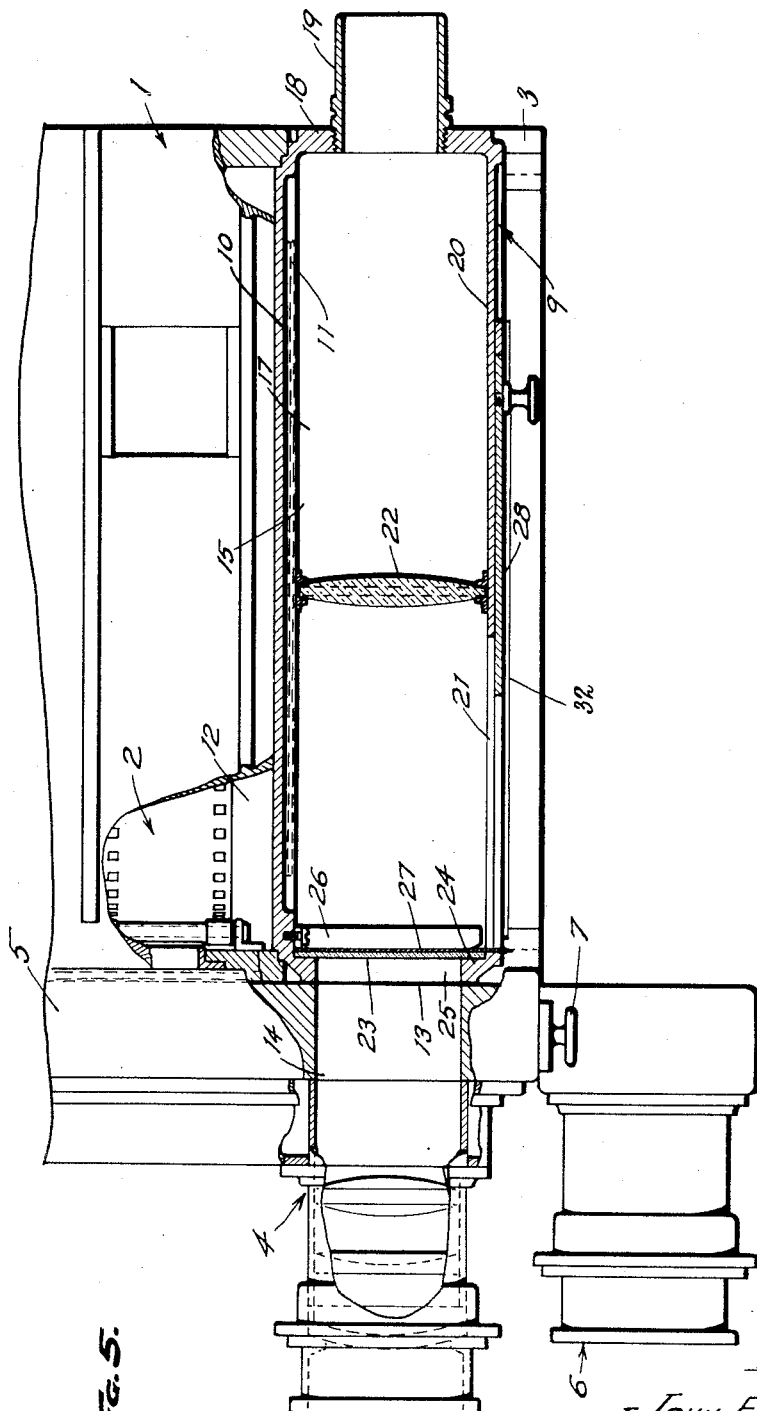
Fig. 5 is an enlarged top plan view and showing the camera box in focusing and spot finding position parts being broken away and shown in section.

Referring to the drawing and detail, the camera box 1 contains the film moving and exposure mechanism 2 and the camera box is mounted to slide transversely upon a base 3. The photographing lens construction 4 is rigidly mounted upon and built into a pedestal 5 and the pedestal 5 is formed integral with or rigid with the base 3.

The finder and viewing lens construction 6 is fitted against the front end of the pedestal 5 and held removably in place by screws 7 and 8. The finder box 9 is mounted upon the door 10 and the door 10 is connected to the camera box 1 by hinges 11 so as to provide access to the film moving mechanism chamber 12 and so as to close the chamber during the operation of photographing.

The finder box 9 is adapted to register with the finder lens construction 6 when the camera box 1 is registering with the photographing lens construction 4 as in photographing and the finder box 9 is adapted to register with the photographing lens 4 when the camera box 1 is moved laterally as in Figs. 1 and 5.

The parting line 13 between the camera box 1 and the photographing lens construction 4 is in front of the shutter mechanism and in front of the film moving and exposure mechanism 2 so that when the camera box 1 is moved to bring the finder box 9 into registration with the photographing lens 4 the passage 14 through the pedestal 5 is unobstructed by shutter mechanism and exposure mechanism and there is a clear view through the photographing lens to the finder box.

The details of the finder box 9 are as follows:

The door 10 forms one of the side walls of the finder box chamber 15. An upper wall 16 and a lower wall 17 extend laterally from the door 10, said upper and lower walls being parallel and imperforate. The rear end wall 18 connects the rear ends of the upper and lower walls 16 and 17 and the eye piece tube 19 is tapped through the center of the rear end wall 18 and the rear end wall 18 is otherwise imperforate.

The other side wall 20 is formed integral with the lateral edges of the upper and lower walls 16 and 17 and the rear end wall 18 and extends from the rear end wall 18 slightly more than half way to the front end of the box, there being an opening 21 between the upper and lower walls 16 and 17 in front of the front end of the side wall 20.

A magnifying glass 22 is mounted in the chamber 15 near the forward end of the side wall 20. A flat ground glass 23 is mounted across the front end of the chamber 15, there being a frame 24 around the front end of the chamber against which the ground glass 23 fits so that the passage 14 through the pedestal 5 will register with the passage 25 through the frame 24 and so that the light passing through the photographing lens and through the passage 14 and through the passage 25 will pass through the ground glass 23 to the magnifying glass 22 and to the eye piece 19.

A frame 26 is inserted into the chamber 15 parallel with the frame 24, said frame 26 extending along the door 10, along the lower face of the upper wall 16 and along the upper face of the lower wall 17 and said frame being open to match the opening 21.

A piece of ground celluloid 27 is removably inserted between the ground glass 23 and the frame 26, the frame 26 serving to hold the celluloid frictionally against the ground glass. The celluloid 27 is a piece of thin transparent celluloid having a ground face which may be marked upon by a pencil.

A door 28 fits against the side outer face of the side wall 20 and extends upwardly and downwardly to fit between the ribs 29 and 30 extending forwardly from the face of the side wall 20 so that the door 28 may slide between the ribs to cover the opening 21 and may slide to uncover the opening.

Guide pieces 31 and 32 are secured to the outer face of the ribs 29 and 30 respectively and extend upwardly and downwardly to form flanges to hold the door 28 in place, the forward ends of the guide pieces 31 and 32 being cut away to allow the celluloid 27 to pass in and out.

In actual practice the celluloid 27 is a piece of washed out film broken off to substantially the right length and ground or roughened by sand paper or the like.

In the operation of doing double exposure work with camera provided with my spot finder, the finder box 9 is moved into registration with the photographing lens construction 4, the door 28 is opened, the ground celluloid 27 is inserted, the photographing lens is adjusted to project the view upon the ground glass 23 and the operator takes a pencil and marks upon the celluloid 27 the outline of the spot 33, then the celluloid 27 is removed and laid away.

The camera is moved into photographing position with the finder box 9 in registration with the finder lens construction 6 and the operation of photographing may be viewed by the operator through the eye piece 19 and the film run through the camera to make the first exposure. Then when it is desired to make the second exposure the camera is adjusted with relation to the second scene to be superimposed upon the first exposure. The celluloid 27 is inserted into place and the parts adjusted to bring the second scene into the outline 33, then the camera is operated to pass the film through the second time to make the second exposure and the second exposure will place the second scene upon the proper place relative to the first exposure.

The ground celluloid 27 forms a light absorbing slide or screen adapted to display the scene projected upon the ground glass 23 by the photographing lens and adapted to receive pencil marks so as to make a record of the desired spot for locating the second exposure. This slide is not necessarily made of transparent celluloid but might be a ground glass plate or any light absorbing plate or scene which will display the scene and receive the pencil marks.

Various changes may be made without departing from the spirit of my invention as claimed.

I claim:

1. A spot finder for motion picture cameras and the like comprising the combination with a base, a pedestal extending upwardly from one side of the base, a photographing lens construction upon the pedestal, a finder lens construction upon the pedestal, and a camera box slidingly mounted upon the base and having photographing mechanism adapted to register with the photographing lens, of a finder box mounted upon the camera box and adapted to register with the finder lens and adapted to register with the photographing lens, a door in the side of the finder box, a ground glass in the forward end of the finder box at the forward end of the door, and a slide adapted to fit against the rear face of the ground glass and adapted to expose a scene projected upon the ground glass and adapted to receive pencil marks.

2. In a motion picture camera a photographing lens, a finder lens, a camera box slidably mounted to move into and out of registration with said photographing lens, a finder construction mounted on said camera box adapted to move into and out of registration with said photographing lens and said finder lens respectively, a door in the side of the finder construction, a ground glass in the finder construction in front of said door, and a slide fitting against the rear face of said ground glass and adapted to expose a scene projected upon the ground glass and adapted to receive pencil marks.

3. A motion picture camera having a photographing lens construction, a camera box slidingly mounted relative to the photographing lens construction, a finder construction mounted upon the camera box and adapted to move into registration with the photographing lens when the camera box moves out of registration, a door in the side of the finder construction, a ground glass in the finder construction in front of the door, a slide fitting against the rear face of the ground glass and adapted to expose a scene projected upon the ground glass and adapted to receive pencil marks, and a finder lens rigidly mounted relative to the photographing lens and adapted to register with the finder construction when the camera box is in photographing position.

In testimony whereof I have signed my name to this specification.

JOHN E. LEONARD.